(12) United States Patent
Nowicki et al.

(10) Patent No.: US 12,704,127 B2
(45) Date of Patent: Aug. 11, 2026

(54) VACUUM PUMP

(71) Applicant: MILWAUKEE ELECTRIC TOOL CORPORATION, Brookfield, WI (US)

(72) Inventors: Brandon W. Nowicki, Brookfield, WI (US); Samuel L. Bertz, Fox Point, WI (US); Christopher J. Derksen, Hartland, WI (US); Parker R. Crowell, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 169 days.

(21) Appl. No.: 18/493,115

(22) Filed: Oct. 24, 2023

(65) Prior Publication Data

US 2025/0129790 A1 Apr. 24, 2025

(51) Int. Cl.

*F04C 29/02* (2006.01)
*F04C 25/02* (2006.01)
*F04C 28/08* (2006.01)
*F04C 28/28* (2006.01)

(52) U.S. Cl.

CPC .............. *F04C 29/02* (2013.01); *F04C 25/02* (2013.01); *F04C 28/08* (2013.01); *F04C 28/28* (2013.01); *F16N 2200/10* (2013.01); *F16N 2200/12* (2013.01); *F16N 2210/16* (2013.01)

(58) Field of Classification Search

CPC .......... F04C 25/02; F04C 28/08; F04C 28/28; F04C 29/02

See application file for complete search history.

(56) References Cited

U.S. PATENT DOCUMENTS 3,290,576 A * 12/1966 Jensen ...................... G01F 1/68 361/99
7,448,220 B2 * 11/2008 Schmidt .................... F02C 7/32 60/788
12,173,710 B2 * 12/2024 Lepore .................... F04C 2/344
2021/0396236 A1 * 12/2021 Grode ................... F04C 29/126
2023/0151744 A1 * 5/2023 Hamacher .............. F01M 5/005 62/193

* cited by examiner

*Primary Examiner* — Charles G Freay
(74) *Attorney, Agent, or Firm* — Michael Best & Friedrich LLP

(57) ABSTRACT

A vacuum pump that is connectable to an external system and configured to evacuate material from the external system. The vacuum pump including a motor operable in a first mode and a second mode that is slower than the first mode, a pump assembly driven by the motor and is lubricated and cooled by a lubricant, and a temperature sensor outputting a temperature signal corresponding to a temperature of the lubricant. The vacuum pump further includes an electronic control unit configured to receive the temperature signal from the temperature sensor, determine an electrical current value being drawn from the motor, operate the motor in the second mode when the temperature signal is below a temperature threshold, maintain the motor in the second mode while the electrical current value is above a current threshold, and operate the motor in the first mode only after the electrical current value remains below the current threshold for a preset time period.

17 Claims, 5 Drawing Sheets

VACUUM PUMP

FIELD OF THE INVENTION

The present invention relates to a pump, and more particularly to a vacuum pump.

BACKGROUND OF THE INVENTION

Vacuum pumps may be used to remove or evacuate material such as unwanted air, gas, and non-condensables (e.g., water vapor), from an external system (e.g., an air conditioning system, a refrigeration system, etc.). Vacuum pumps may be used to evacuate the external system before the system is charged with refrigerant or when the existing system is undergoing repair (e.g., the refrigerant is already recovered). The vacuum pump may be connected to high- and low-pressure sides of the external system via hoses and a manifold. During operation, the vacuum pump creates a low-pressure zone that draws the unwanted materials such as air and non-condensables out of the external system, which has a high pressure, and into the vacuum pump.

SUMMARY OF THE INVENTION

The present disclosure provides, in one aspect, a vacuum pump that is connectable to an external system and configured to evacuate material from the external system. The vacuum pump including a motor operable in a first mode and a second mode that is slower than the first mode, a pump assembly driven by the motor and is lubricated and cooled by a lubricant, and a temperature sensor outputting a temperature signal corresponding to a temperature of the lubricant. The vacuum pump further includes an electronic control unit configured to receive the temperature signal from the temperature sensor and operate the motor in the second mode when the temperature signal is below a temperature threshold.

The present disclosure provides, in another aspect, a vacuum pump that is connectable to an external system and configured to evacuate material from the external system. The vacuum pump includes a motor operable in a first mode and a second mode that is slower than the first mode, a pump assembly driven by the motor and is lubricated and cooled by a lubricant, and a temperature sensor outputting a temperature signal corresponding to a temperature of the lubricant. The vacuum pump further includes an electronic controller configured to receive the temperature signal from the temperature sensor, operate the motor in the second mode when the temperature signal is below a temperature threshold, and operate the motor in the first mode after the temperature signal is above the temperature threshold.

The present disclosure provides, in another aspect, a vacuum pump that is connectable to an external system and configured to evacuate material from the external system. The vacuum pump includes a motor operable in a first mode when the lubricant is in a first viscous state, in which the lubricant has a first viscosity value at a first temperature, and a second mode when the lubricant is in a second viscous state, in which the lubricant has a second viscosity value at a second temperature. The second mode is slower than the first mode. A pump assembly is driven by the motor and is lubricated and cooled by the lubricant. The vacuum pump further includes an electronic controller configured to determine an electrical current value being drawn from the motor, indefinitely operate the motor in the second mode while the electrical current value is above a current threshold due to the lubricant being in the second viscous state, and operate the motor in the first mode only after the electrical current value stays below the current threshold for a preset time period after the lubricant has transitioned from the second viscous state to the first viscous state.

Other features and aspects of the invention will become apparent by consideration of the following detailed description and accompanying drawings.

Figure 1:
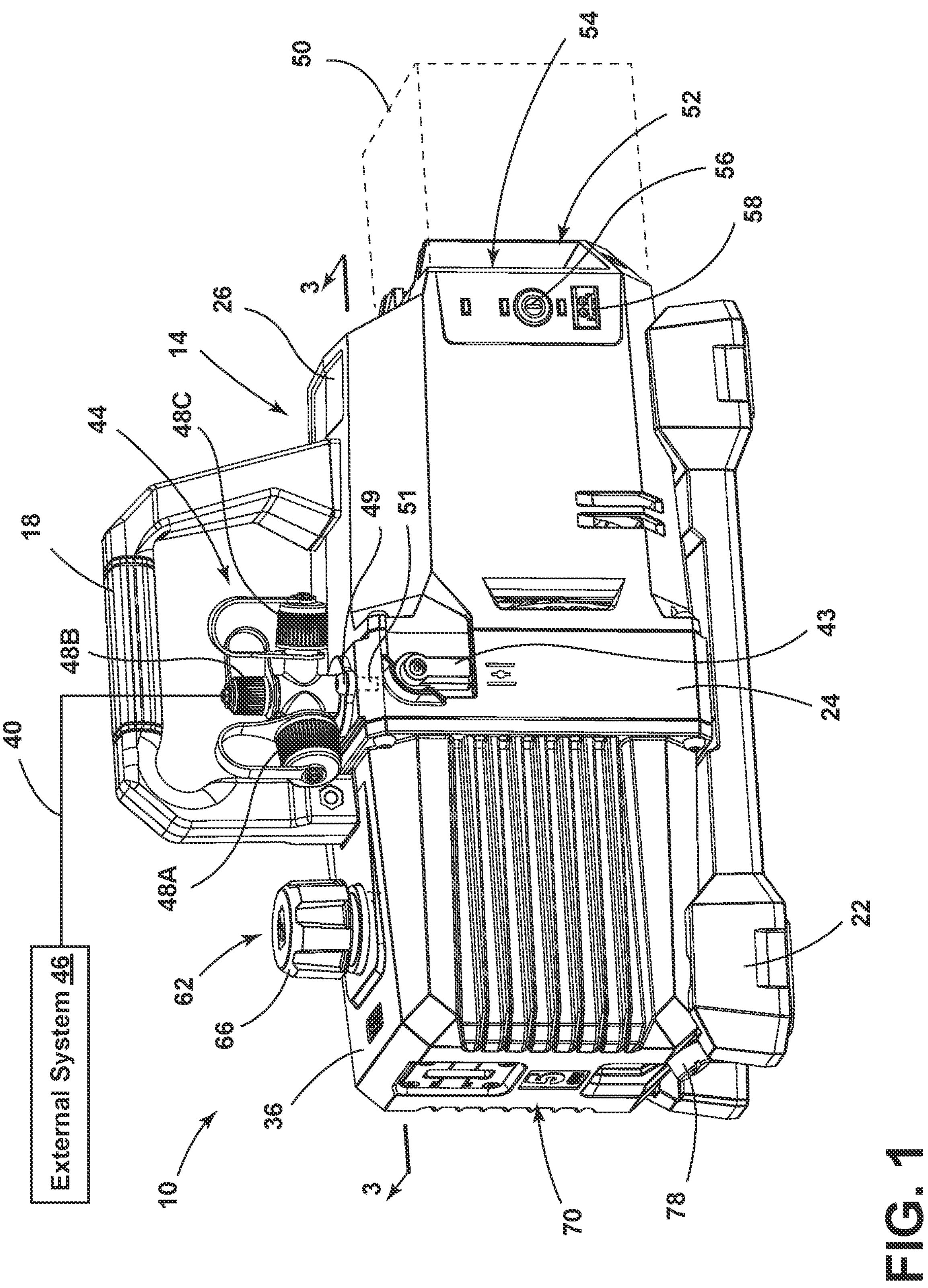
FIG. 1 is a left perspective view of a vacuum pump according to an embodiment of the invention.

Before any embodiments of the present subject matter are explained in detail, it is to be understood that the present subject matter is not limited in its application to the details of construction and the arrangement of components set forth in the following description or illustrated in the following drawings. The present subject matter is capable of other embodiments and of being practiced or of being carried out in various ways.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations, for example, collectively. To reiterate, those electronic processors and processing may be distributed.

DETAILED DESCRIPTION

FIGS. 1-4 illustrate a vacuum pump 10 including a housing 14, a handle 18 coupled to an upper portion of the housing 14, and a base 22 coupled to a lower portion of the housing 14 to support the vacuum pump 10 relative to a support surface. The housing 14 includes a trestle 24, a motor housing 26 that houses, protects, and/or conceals a motor assembly 30 (FIGS. 3 and 4), an electronic control unit 34, and other electronic components. The housing 14 further includes a pump housing 36 that houses a pump assembly 42 within a compression chamber 38. The trestle 24 is disposed between the motor housing 26 and the pump housing 36.

With continued reference to FIGS. 1-4, an inlet manifold 44 is positioned on an upper portion of the trestle 24 and is in communication with the pump assembly 42 via a valve switch 43 (FIG. 1). The inlet manifold 44 is fluidly connected to a hose 40 that connects the vacuum pump 10 to an external system 46 (e.g., an air conditioning system, a refrigeration system, etc.). In the illustrated embodiment, the inlet manifold 44 includes multiple connection ports 48A, 48B, 48B that are sized to connect to the hose 40 of the external system 46. For example, the connection ports 48A, 48B, 48C may have various sizes (e.g., ½ inch, ⅜ inch, ¼ inch, etc.), as shown in FIG. 1. In the illustrated embodiment, the inlet manifold 44 is a flange-style tri-manifold that is fastened to the trestle 24 using a plurality of threaded fasteners 49 (FIG. 1) received within corresponding threaded bores 51 within the trestle 24.

A battery pack 50 is removably coupled to an end portion of the housing 14 via a battery receptacle 52. The battery pack 50 provides electrical current to the motor assembly 30 that drives the pump assembly 42 to remove or evacuate material such as air, gas, and non-condensables (e.g., water vapor) from the external system 46. The vacuum pump 10 includes a control panel 54 (FIG. 1) disposed on the motor housing 26 and includes a power switch 56 that selectively activates the vacuum pump 10 and a Universal Serial Bus (USB) port 58. In some embodiments, an external display may be connected to the USB port 58 to display information related to the operation of the vacuum pump 10 (e.g., battery life remaining, micron gauge, etc.). In other embodiments, the control panel 54 may include a display (e.g., an LCD display).

Figure 3:
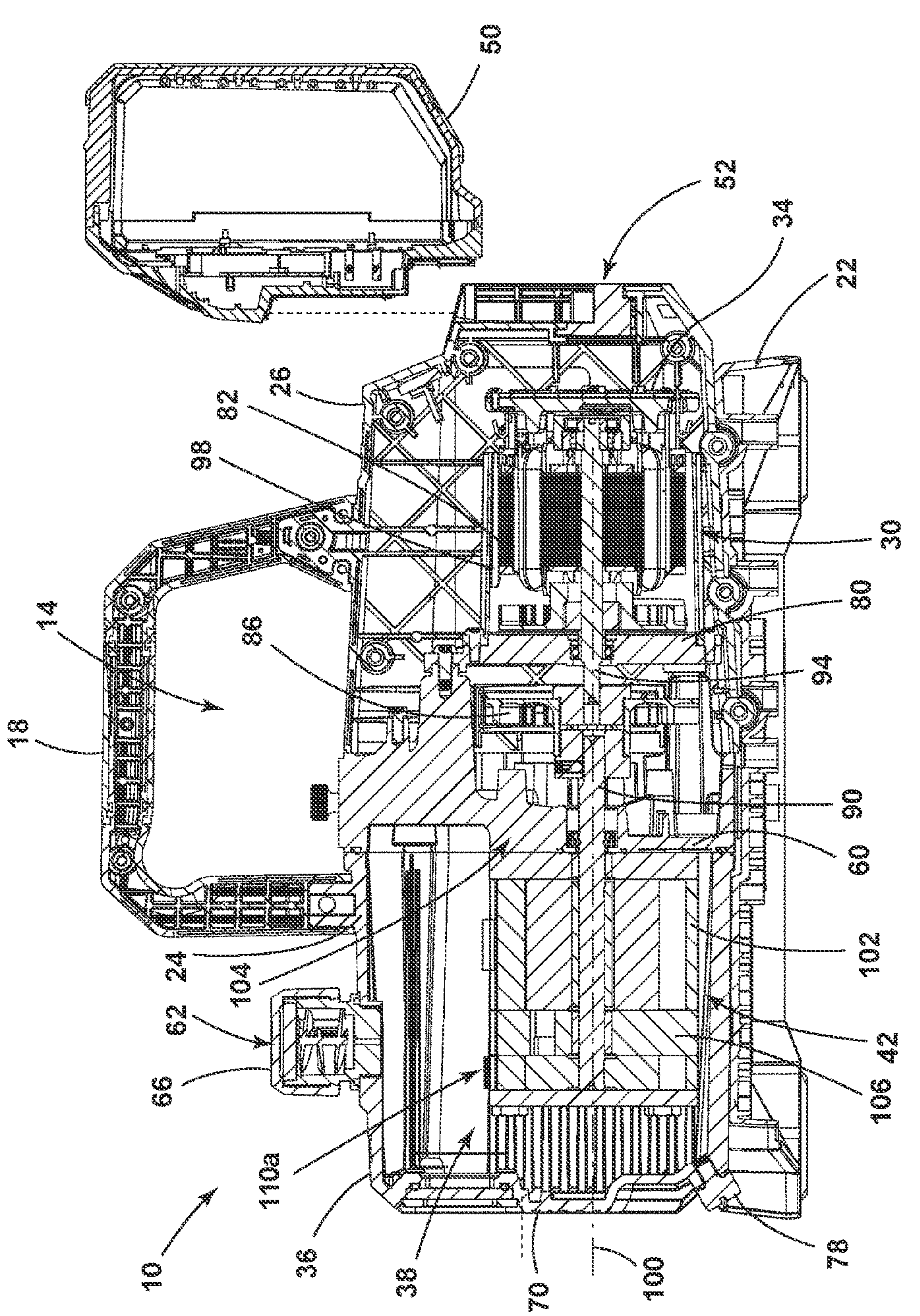
FIG. 3 is a cross-sectional plan view of the vacuum pump along line 3-3 of FIG. 1.

With reference to FIG. 3, the compression chamber 38 is sealed relative to the motor housing 26 via the trestle 24 so the compression chamber 38 can hold lubrication fluid 64 (e.g., oil). Specifically, the trestle 24 includes a partition wall 60 that seals the compression chamber 38 from the motor housing 26. The trestle 24 defines a fluid pathway 68 (FIG. 4) that extends between the inlet manifold 44 and the pump assembly 42. The lubrication fluid 64 positioned within the compression chamber 38 is used to lubricate and cool the pump assembly 42 during operation of the vacuum pump 10.

Figure 2:
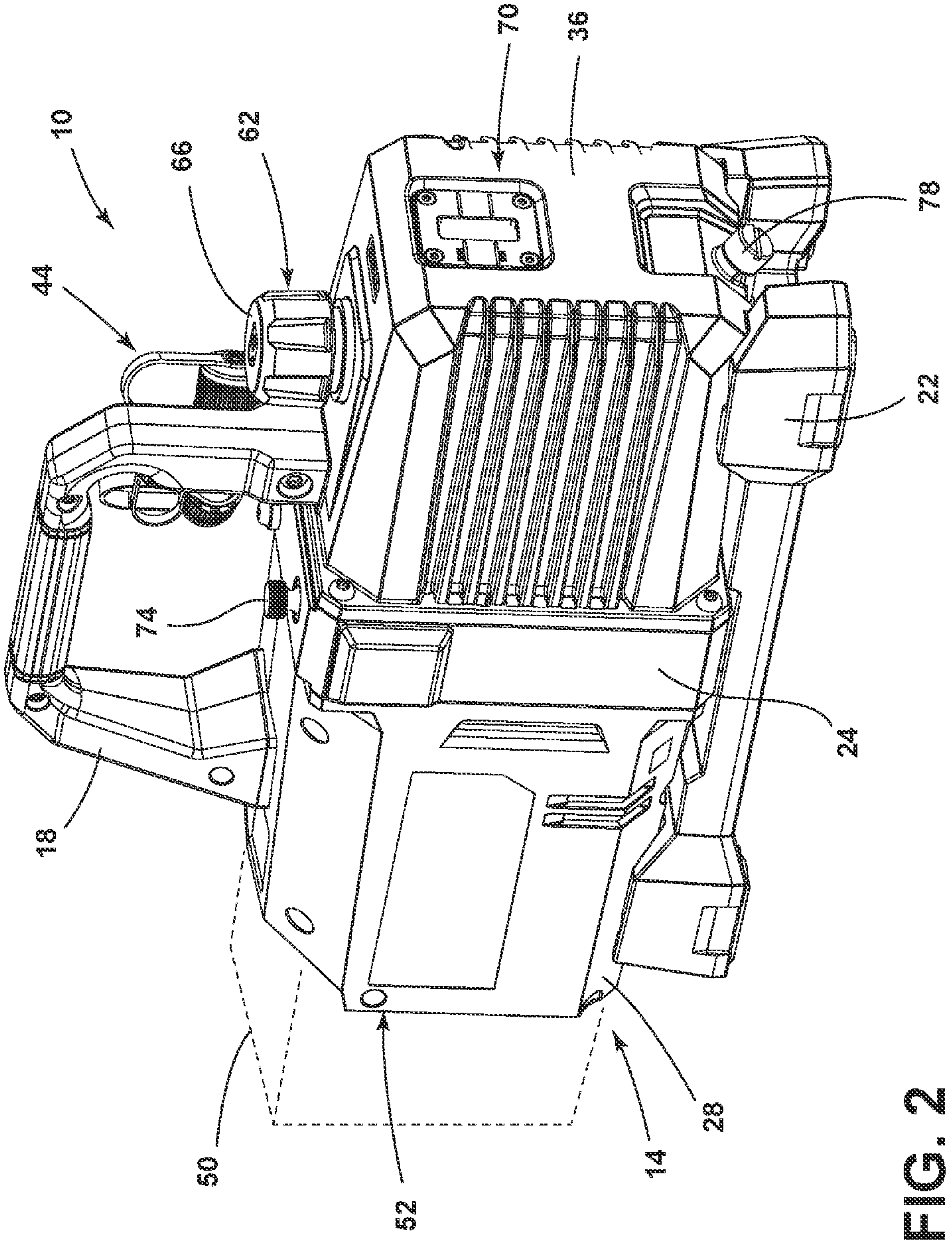
FIG. 2 is a right perspective view of the vacuum pump of FIG. 1.

With reference to FIGS. 2 and 3, the compression chamber 38 further includes a fluid port 62 having a removable cap 66, a fluid gauge 70 positioned on a sidewall of the pump housing 36, a release valve 74 (FIG. 2) positioned on the upper portion of the trestle 24, and a fluid drain valve 78 positioned at the bottom of the compression chamber 38 adjacent the base 22. In the illustrated embodiment, a user may remove the removable cap 66 to fill the compression chamber 38 with lubrication fluid 64 via the fluid port 62. The fluid port 62 and the removable cap 66 may also function as an exhaust during operation of the vacuum pump 10. The fluid gauge 70 may be transparent to allow a user to determine the amount of lubrication fluid 64 that is held within the compression chamber 38. Also, the fluid drain valve 78 allows the user to drain the lubrication fluid 64 from the compression chamber 38.

Figure 4:
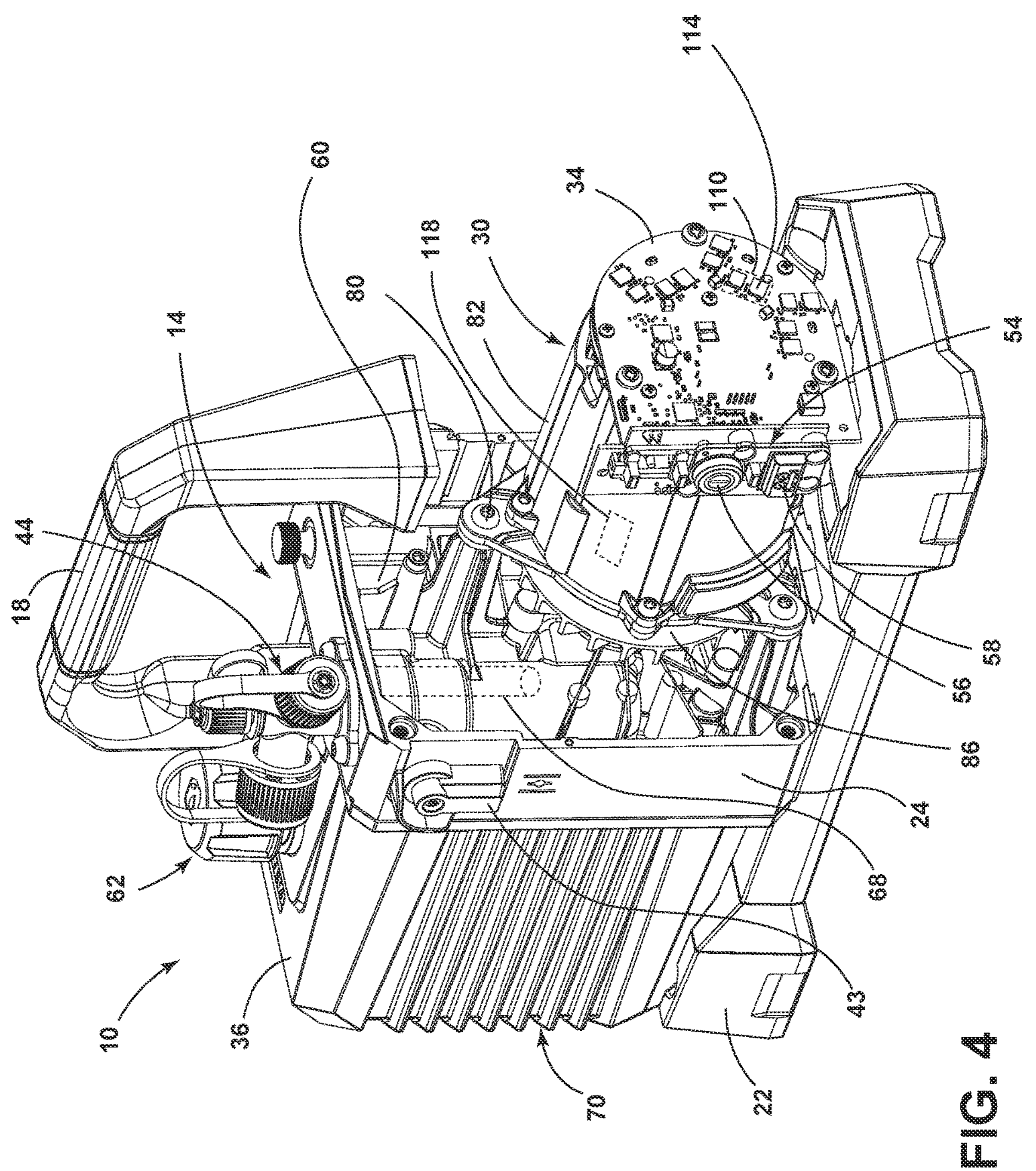
FIG. 4 is a view of the vacuum pump of FIG. 1 with a portion of the housing removed, illustrating a motor assembly and a controller.
Figure 5:
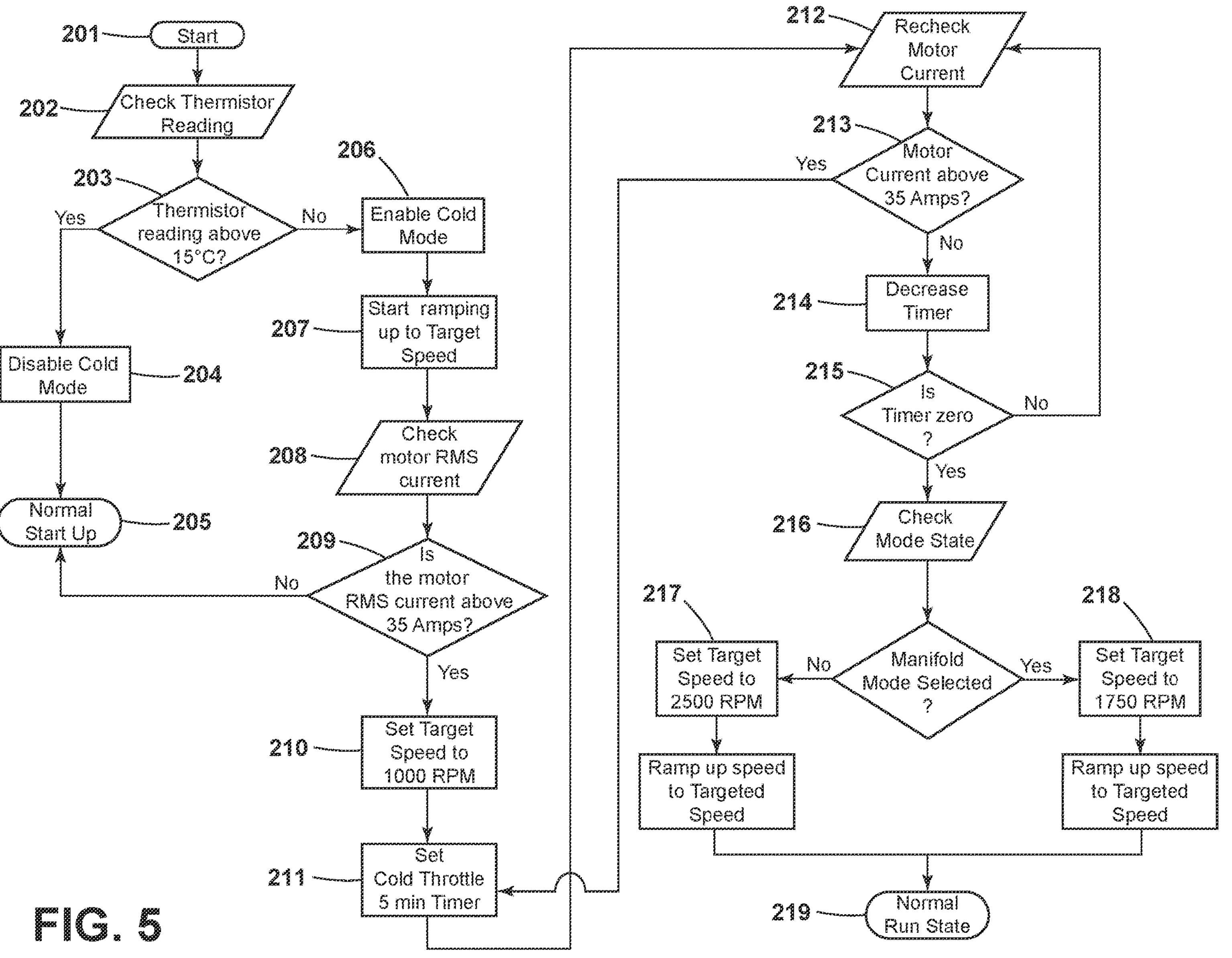
FIG. 5 is a flow chart illustrating operation of the vacuum pump in various modes.

With reference to FIG. 4, the motor assembly 30 is positioned within the motor housing 28 and is coupled to the partition wall 60 of the trestle 24 via a support bracket 80. The motor assembly 30 includes a motor 82 and a fan 86 driven by the motor 82. In the illustrated embodiment, the motor 82 is a brushless direct current (BLDC) motor that has a motor shaft 90 that drives the fan 86 and the pump assembly 42, a rotor 94 coupled to the motor shaft 90, and a stator 98 surrounding the rotor 94. During operation of the motor 82, an electrical current flows through coils of the stator 98 to produce a magnetic field around the rotor 94, causing the rotor 94 and the motor shaft 90 to rotate about a drive axis 100 and drive the pump assembly 42. The fan 86 is positioned on an opposite end of the motor 82 to that of the electronic control unit 34. The fan 86 removes heat from the electronic control unit 34 and provides air to the motor assembly 30 to prevent overheating of each of the electronic control unit 34 and the motor assembly 30. Although the motor 82 of the illustrated embodiment is a BLDC motor, in other embodiments, the motor 82 may alternatively be a brushed direct current motor or any other type of DC motor.

With reference to FIG. 3, the pump assembly 42 is a two-stage pump that has a first pump chamber 102 and a second pump chamber 106 in series with the first pump chamber 102. The first pump chamber 102 is in communication with the fluid pathway 68 and the second pump chamber 106. The second pump chamber 106 then releases the pressure from the pump assembly 42 to the compression chamber 38 before being released from the vacuum pump 10 through the exhaust (e.g., via the cap 66) of the compression chamber 38. Although the illustrated pump assembly 42 is a two-stage pump (e.g., has first and second pump chambers), in other embodiments, the pump assembly 42 may only include a single stage or chamber.

When the vacuum pump 10 is subject to a cold external environment, the lubrication fluid 64 becomes highly viscous, for example, when the lubrication fluid 64 reaches a temperature of 15 degrees Celsius or less. In turn, when the motor 82 is initially activated, it must draw a higher electrical current to operate the pump assembly 42 while the viscosity of the lubrication fluid 64 is relatively high. To avoid unnecessary electrical charge depletion of the battery pack 50 in this situation, the vacuum pump 10 operates in a cold mode, in which the motor 82 is operated at a reduced speed (and thus draws less electrical current from the battery pack 50) until the lubrication fluid 64 warms up and becomes less viscous, as explained in further detail below.

The vacuum pump 10 is operable in several operating modes. Using the control panel 54, a user may select between a first mode or "default mode", in which the motor 82 rotates at approximately 2,500 revolutions per minute (RPM), and an "economy mode," in which the motor 82 rotates at approximately 1,750 RPM. The vacuum pump 10 automatically switches to a "low battery mode" when the battery pack 50 has been electrically depleted approximately 75% or more, at which point the motor 82 rotates at approximately 1,300 RPM. In low battery mode, the pump assembly 42 is able to maintain a vacuum through the hose 40 and the external system 46 while a user switches the battery pack 50 for a new battery pack. In a second mode or "cold mode", the motor 82 rotates at approximately 1,000 RPM. The vacuum pump 10 automatically switches to the cold mode when the lubrication fluid 64 or some component of the vacuum pump 10 is detected as being below a temperature threshold. In some embodiments, the temperature threshold is 15 degrees Celsius, while in other embodiments, the temperature threshold may alternatively be less or greater than 15 degrees Celsius. The economy mode and low battery mode may also be referred to hereinafter as a "third mode" and a "fourth mode", respectively.

The vacuum pump 10 includes a temperature sensor 110 (e.g., thermistor) that is in electrical communication with the electronic control unit 34 to detect the temperature of the lubricating fluid 64. In the illustrated embodiment, the thermistor 110 is coupled directly to and detects a temperature of one or more heat generating electronic components (e.g., MOSFETs, resistors, transistors, capacitors, inductors, sensors, etc.) of the electronic control unit 34. Specifically, the thermistor 110 is coupled to and detects the temperature of at least one of a plurality of power transistors 114 supplying electrical current to the motor 82. The power transistors 114 produce heat as the motor 82 draws current and the thermistor 110 sends a temperature signal to the electronic control unit 34 corresponding to the amount of heat produced by the power transistors 114. The electronic control unit 34 calculates (i.e., interpolates) the temperature of the lubrication fluid 64 based on the temperature signal from the thermistor 110. Thus, the electronic control unit 34 indirectly detects the temperature of the lubrication fluid 64 based on the temperature of the power transistors 114. In other embodiments, a thermistor 110*a* is disposed within the pump housing 36 and in direct contact with the lubrication fluid 64 to directly obtain a temperature of the lubrication fluid 64. In yet other embodiments, both of the thermistors 110, 110*a* may be used.

The vacuum pump 10 further includes a current sensor 118 that is in electrical communication with the electronic control unit 34 to detect an amount of current drawn by the motor 82. As explained in further detail below, the amount of current drawn by the motor 82 is another indication of the viscosity of the lubrication fluid 64, and therefore, at least partially dictates the operation of the vacuum pump 10.

During operation, a user may attach the battery pack 50 to the battery receptacle 52 of the vacuum pump 10, and fluidly connect the external system 46 to the vacuum pump 10 via the inlet manifold 44 (e.g., with the hose 40). The user may activate the vacuum pump 10 with the control panel 54 (e.g., by depressing the power switch 56), as represented by step 201. Upon powering on, the electronic control unit 34 obtains the temperature signal from the thermistor 110, as represented by step 202. If the temperature signal from the thermistor 110 is above the temperature threshold, then the motor assembly 30 is activated according to the selected operating mode (i.e., first or default mode, third mode, or fourth mode) and begins evacuating material from the external system 46, as shown in steps 203-205. In contrast, if the temperature signal from the thermistor 110 is below the temperature threshold, then the vacuum pump 10 transitions into the cold mode, as represented by step 206.

During the cold mode, the motor 82 is driven at 1,000 RPM (step 207), at which point the electronic control unit 34 determines the amount of electrical current that is being supplied to the motor 82 to maintain this speed (step 208). If the determined electrical current value is below a preset current threshold (step 209), then operation of the motor assembly 30 is adjusted according to the selected operating mode (i.e., first or default mode, third mode, or fourth mode) and begins evacuating material from the external system 46 (step 205). If the determined electrical current value is above the preset current threshold, then the motor continues to rotate at 1,000 RPM (step 210) and a timer is set (step 211) but not decremented yet. First, the electronic control unit 34 once again determines the amount of electrical current that is being supplied to the motor 82 to maintain a rotational speed of 1,000 RPM (step 212). If the determined electrical current value is above the preset current threshold (step 213), the electronic control unit 34 loops through steps 211-213, where the timer remains at 5 minutes (and not decremented) and the electronic control unit 34 continues to sample the electrical current value. Once the electrical current value is below the preset current threshold, the 5-minute timer is decremented by a decisecond (i.e., tenth of a second), as shown in step 214. At step 215, the electronic control unit 34 determines whether the timer is zero yet. If the timer is not zero, the electronic control unit 34 loops through steps 212-214 until the timer is zero. At this point, the selected operating mode is checked (step 216) and the vacuum pump 10 goes into the default mode (step 217) and ramps up to speed (i.e., 2,500 RPM; step 217) or the economy mode and ramps up to speed (i.e., 1,750 RPM; step 218), where the vacuum pump 10 runs normally (step 219).

In some embodiments, the preset current threshold is 35 amperes, while in other embodiments, the preset current threshold may alternatively be lower or higher than 35 amperes.

When the vacuum pump 10 is running normally (step 219), for example, in the first mode, the motor 82 is driven at 2,500 RPM and draws an amount of current that is less than a preset current threshold, so long as the lubrication fluid 64 is in a first viscous state in which the lubrication fluid 64 has a first viscosity value at a first temperature. However, in the situation where a user adds cold lubrication fluid 64 to the compression chamber 38 mid-operation, the thermistor 110 may not detect that the temperature of the lubrication fluid 64 is below the temperature threshold, especially in the embodiment where the thermistor 110 is detecting the temperature of the power transistors 114. However, once the cold lubrication fluid 64 is placed in the compression chamber 38, the motor 82 operating at 2,500 RPM draws an amount of current that is greater than the preset current threshold because the cold lubrication fluid 64 is in a second viscous state, in which the lubrication fluid 64 has a second, higher viscosity value at a second, lower temperature. In response, the vacuum pump 10 transitions from the default mode into the cold mode (step 206) to avoid an excessive amount of current being drawn, which may otherwise prematurely deplete the electrical charge of the battery pack 50.

Although the operation modes—specifically, the cold mode—have been described with respect to a vacuum pump, the operation modes described herein may alternatively be incorporated in other hydraulic power tools, hydraulic machines, or other hydraulic systems.

Various features of the invention are set forth in the following claims.

What is claimed is:

1. A vacuum pump that is connectable to an external system and configured to evacuate material from the external system, the vacuum pump comprising:

a motor operable at a first speed and a second speed that is slower than the first speed;

a pump assembly driven by the motor, the pump assembly being lubricated and cooled by a lubricant;

a temperature sensor outputting a temperature signal corresponding to a temperature of the lubricant; and an electronic control unit configured to:

receive the temperature signal from the temperature sensor, rotate the motor to operate the pump assembly at the second speed when the temperature signal is below a temperature threshold.

2. The vacuum pump of claim 1, further comprising a main housing including a motor housing that houses the motor, a pump housing that houses the pump assembly, a partition wall that separates the motor housing and the pump housing, and a battery that is coupled to the motor housing and configured to supply electrical current to the motor, wherein the pump housing is sealed relative to the motor housing to form a compression chamber that holds the lubricant.

3. The vacuum pump of claim 2, wherein the temperature sensor is disposed within the pump housing and directly detects a temperature of the lubricant.

4. The vacuum pump of claim 1, wherein the electronic control unit is further configured to determine an electrical current value being drawn by the motor, maintain operation of the motor at the second speed while the electrical current value is above a current threshold, and operate the motor at the first speed only after the electrical current value remains below the current threshold for a preset time period.

5. The vacuum pump of claim 1, wherein the temperature sensor is a thermistor.

6. The vacuum pump of claim 1, wherein the motor is a brushless direct- current electric motor, wherein the vacuum pump further comprises a plurality of power transistors that supply electrical current to the motor, and wherein the temperature sensor is coupled to at least one of the power transistors to detect a temperature of the power transistor, such that the controller receives the temperature signal from the temperature sensor and indirectly detects a temperature of the lubricant based on the temperature of the power transistor.

7. The vacuum pump of claim 1, wherein the temperature threshold is 15 degrees Celsius, and wherein the current threshold is 35 amperes.

8. The vacuum pump of claim 1, wherein the motor is rotated at 2,500 revolutions per minute when being rotated at the first speeding speed and wherein the motor is rotated at 1,000 revolutions per minute when being rotated at the second speed.

9. A vacuum pump that is connectable to an external system and configured to evacuate material from the external system, the vacuum pump comprising:

a motor operable at a first speed and a second speed that is slower than the first speed;

a pump assembly driven by the motor, the pump assembly being lubricated and cooled by a lubricant;

a temperature sensor outputting a temperature signal corresponding to a temperature of the lubricant; and an electronic controller configured to:

receive the temperature signal from the temperature sensor, rotate the motor to operate the pump assembly at the second speed when the temperature signal is below a temperature threshold, and rotate the motor to operate the pump assembly at the first speed after the temperature signal is above the temperature threshold.

10. The vacuum pump of claim 9, further comprising a main housing including a motor housing that houses the motor, a pump housing that houses the pump assembly, a partition wall that separates the motor housing and the pump housing, and a battery that is coupled to the motor housing and configured to supply electrical current to the motor, wherein the pump housing is sealed relative to the motor housing to form a compression chamber that holds the lubricant.

11. The vacuum pump of claim 10, wherein the temperature sensor is disposed within the pump housing and directly detects a temperature of the lubricant.

12. The vacuum pump of claim 9, wherein the temperature sensor is a thermistor.

13. The vacuum pump of claim 9, wherein the motor is a brushless direct-current electric motor, wherein the vacuum pump further comprises a plurality of power transistors that supply electrical current to the motor, and wherein the temperature sensor is coupled to at least one of the power transistors to detect a temperature of the power transistor, such that the controller receives the temperature signal from the temperature sensor and indirectly detects a temperature of the lubricant based on the temperature of the power transistor.

14. The vacuum pump of claim 9, wherein the temperature threshold is 15 degrees Celsius.

15. The vacuum pump of claim 9, wherein the controller is further configured to determine an electrical current value being drawn from the motor.

16. The vacuum pump of claim 15, wherein the controller maintains operation of the motor at the second speed while the electrical current value is above a current threshold.

17. The vacuum pump of claim 16, wherein the controller operates the motor at the first speed after the electrical current value remains below the current threshold for a preset time period, wherein the current threshold is 35 amperes.

* * * * *